United States Patent [19]

Uchiyama et al.

[11] Patent Number: 4,897,667

[45] Date of Patent: Jan. 30, 1990

[54] INK JET PRINTER

[75] Inventors: Tadamitsu Uchiyama; Katsuyuki Fujii; Shoichiro Kakuta, all of Osaka, Japan

[73] Assignee: Minolta Camera Kabushiki Kaisha, Osaka, Japan

[21] Appl. No.: 284,677

[22] Filed: Dec. 15, 1988

[30] Foreign Application Priority Data

Dec. 17, 1987 [JP] Japan ............................ 62-317538
Feb. 9, 1988 [JP] Japan ............................ 63-28218

[51] Int. Cl.⁴ ............................ G01D 15/18
[52] U.S. Cl. ............................ 346/75
[58] Field of Search ............................ 346/75

[56] References Cited

U.S. PATENT DOCUMENTS 3,947,851 3/1976 Chen et al. ............................ 346/1.1
4,490,729 12/1984 Clark et al. ............................ 346/75
4,673,951 6/1987 Mutoh et al. ............................ 346/75

*Primary Examiner*—H. Broome
*Assistant Examiner*—Gerald E. Preston
*Attorney, Agent, or Firm*—Burns, Doane, Swecker & Mathis

[57] ABSTRACT

Disclosed is an ink jet printer in which an ink is continuously spouted through a nozzle and divided into ink droplet. The ink droplets are selectively charged by supplied pulse voltages. After the supply of a prescribed charging voltage to a charging electrode is stopped, a voltage lower than the charging voltage is supplied to the electrode. Consequently, the ink droplets destined to land on a recording medium is prevented from making any deflected movement and from ginving rise to secondary dots. During the intitial period of the supply of the charging voltage to the charging electrode, a voltage higher that the normal charging voltage is supplied to preclude the occurrence of ink droplets of an intermediate potential due to a time lag between the time the voltage is supplied to the charging electrode and the time the ink droplets are electrically charged. Any attempt at heightening the operating speed of the printer entails no occurrence of secondary dots. The ink droplets in flight toward a recording medium, therefore, are allowed to land at a prescribed position on the recording medium and produce an image of high quality.

13 Claims, 10 Drawing Sheets

INK JET PRINTER

BACKGROUND OF THE INVENTION

1. Field of the Invention

This invention relates to an ink jet printer. More particularly, this invention relates, in an ink jet printer, to a circuit for selectivery ink droplets based on image data.

2. Description of the Prior Art

U.S. Pat. No. 4,673,951 discloses a Hertz-type ink jet printer which is provided with an ink discharge nozzle with a piezoelectric oscillator. The number of oscillations imparted by the oscillator to the nozzle is fixed at a prescribed magnitude by the characteristics of ink, the inner diameter of nozzle orifice, and the flow rate of ink. By the oscillations thus imparted to the nozzle, the ink spouted from the nozzle is caused to fly in the form of minute droplets of a fixed diameter spaced at fixed intervals toward a recording paper. Inside this nozzle is disposed a charging electrode to which charging signals based on image data are fed.

A control electrode is interposed between a rotary drum for holding the recording paper and the nozzle. This control electrode is provided with a deflection electrode and a grounding electrode. Between the deflection electrode and the grounding electrode, an electric field for deflection is formed in the direction perpendicular to the axis of the nozzle. The row of ink droplets which has been spouted from the nozzle is propelled toward the record paper when it has not be charged by the charging electrode within the nozzle or is deflected by the electric field, trapped by the control electrode, and wasted when it has been charged.

In the ink jet printer described above, when the ink droplets spouted from the nozzle are propelled as arrayed linearly, they ought to produce an image of desired quality. Actually, however, the image formed on the record paper is observed to be blurred with minute ink dots other than desired ink dots. The occurrence of such very minute ink dots prevents production of an image of high quality. The inventors have conducted various experiments and researches with a view to improving the quality of an image to be formed on the recording paper, to find that the following cause can be adduced for the occurrence of these minute ink dots.

The leading end of the row of uncharged ink droplets destined to form a recorded image is caused under the electrical influence of the preceding row of charged ink droplets to be dislocated in the direction of the deflection electrode and, during the course of this dislocation, very minute ink dots or secondary dots inducive of impairment of image quality occur near the recording dots inherently used for recording.

After further experiments and researches, they have found that when the propelling speed of ink is heightened, the ink droplets in the trailing end part of the row of uncharged ink droplets to be used for recording deviate toward the grounding electrode side and the ink droplets in the trailing and part of the row of charged ink droplets deviate toward the deflection electrode. This behavior of such ink droplets may be logically explained by a postulate that a time lag occurs between the time the output voltage for charging is fed to the charging electrode within the nozzle and the time the ink is charged to the prescribed maximum level and, at the same time, a time lag also intervenes between the time the supply of the voltage to the charging electrode is stopped and the time the charge of the ink falls to the minimum level. These time lags give rise to ink droplets charged to an intermediate level in addition to the uncharged ink droplets and the ink droplets charged to the maximum level. These additionally formed ink droplets are deviated in a direction perpendicular to the axial direction of the nozzle under the influence of the electric field and the ink droplets thus deviated, during the course of the travel of deviation, give rise to secondary dots. When these secondary dots land on the recording paper, they induce impairment of an image or lines.

SUMMARY OF THE INVENTION

The main object of this invention is to provide an ink jet printer which is capable of forming an image or lines of high quality at a high speed on a recording paper.

Another object of this invention is to provide an ink jet printer which is capable of precluding the occurrence of very minute secondary dots due to the deviated advance of ink droplets destined to land on the recording paper by preventing the ink droplets in flight toward the recording paper from the influence of ink droplets not destined to land on the recording paper.

A further object of this invention is to provide an ink jet printer which enables the row of ink droplets to be used for recording to be advanced as arrayed linearly in the direction of the recording paper by causing the row of ink droplets destined to land on the recording paper to be charged to a fixed level such as the charge of zero.

Yet another object of this invention is to provide an ink jet printer which is capable of infallibly preventing the ink droplets not intended for use in recording from reaching the recording paper.

In accordance with the present invention there is provided a ink jet printer comprising: spouting means for spouting a column of ink through a nozzle, nozzle oscillating means for dividing the column of ink into ink droplets, voltage applying means for selectively applying a first pulse voltage to the ink droplets thereby charging them based on image data and applying a second pulse voltage lower than the first pulse voltage to the ink droplets immediately after the application of said first pulse voltage, and means for producing a deflection electric field capable of deflecting one ink droplet charged by the application of the first pulse voltage and enabling another ink droplet not charged to proceed straight in the direction of a recording medium.

In the present invention, since the ink droplets directed toward the recording paper are allowed to advance straightly through the deflection electric field without entailing any deviated movement, they do not give rise to any secondary dot but produce an image or lines of high quality on the recording paper.

In accordance with the present invention there is provided a ink jet printer comprising: spouting means for spouting a column of ink through a nozzle, nozzle oscillating means for dividing the column of ink into ink droplet, voltage applying means for selectively applying a pulse voltage to the ink droplets thereby charging them based on image date and for superposing an excessive voltage on the pulse voltage at the positive edge of said pulse voltage, and means for producing a deflection electric field capable of deflecting one ink droplet charged by the application of the first pulse voltage and enabling another ink droplet not charged to proceed straight in the direction of a recording medium.

Further in the present invention, the impairment of image quality and the defilement of the background of recording paper due to the presence of ink droplets charged to an intermediate level are precluded because the ink droplets in flight are charged either to the prescribed level or to the level of zero and never to the intermediate level.

DETAILED DESCRIPTION OF THE INVENTION

Figure 1:
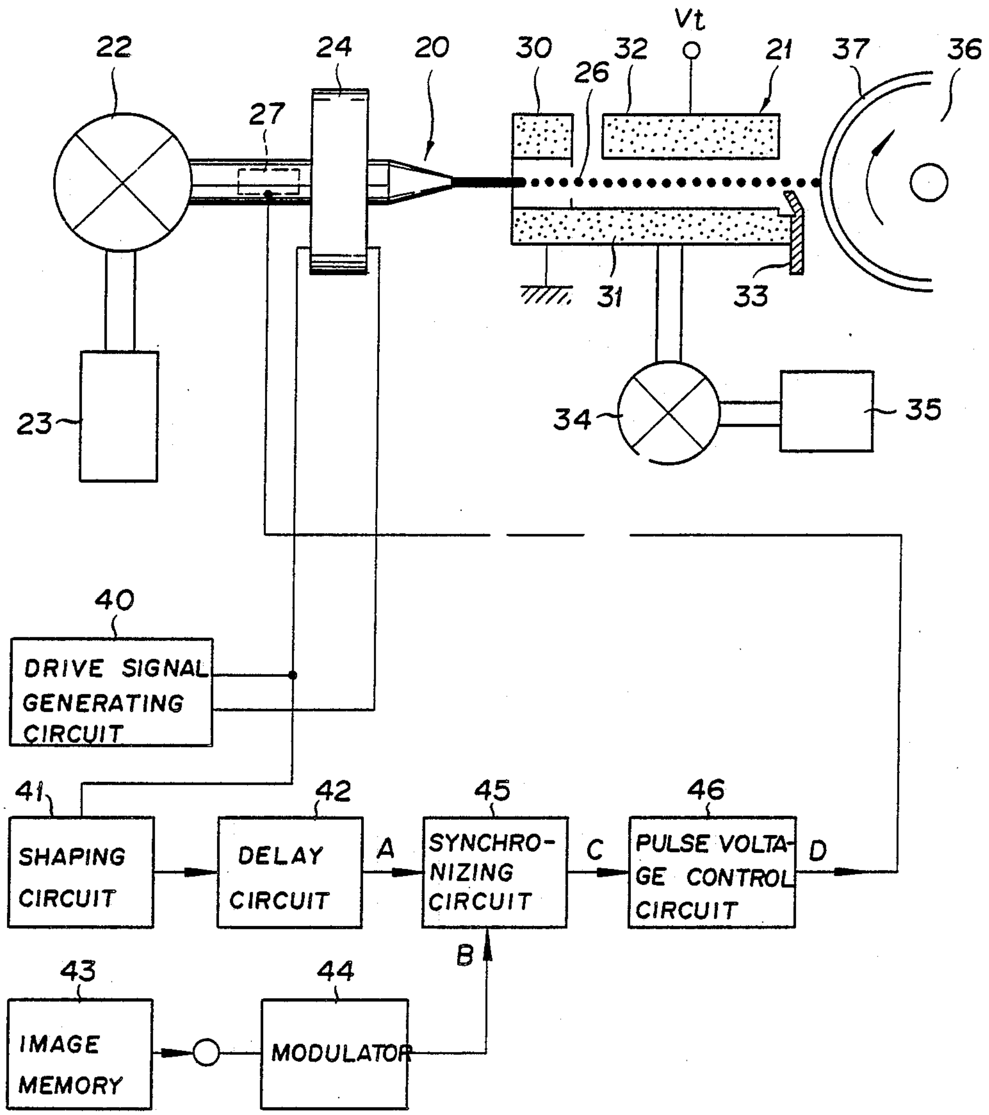
FIG. 1 is a diagram schematically illustrating an ink jet printer of the present invention.

FIG. 1 is a diagram schematically illustrating an ink jet printer as one embodiment of the present invention. A head of the ink jet printer comprises a nozzle 20 having an orifice about 10 μm in inside diameter and a control electrode 21. To this nozzle 20 is connected a pressure pump 22. This pump 22 serves to cause ink held in an ink tank 23 to be fed as pressed to a level of about 3.9 MPa (40 atm.) to the nozzle 20 at an initial velocity of about 40 m/sec. The nozzle 20 is fitted with an annular piezoelectric oscillator 24. By this oscillator 24, the nozzle 20 is oscillated at a prescribed frequency such as, for example, an oscillating frequency of 1 MHz. The ink spouted from the nozzle 20 is caused by the surface tension of its own and the oscillation imparted thereto by the oscillator 24 to form ink droplets 26 about 25 μm in diameter.

Inside the nozzle 20, a charging electrode 27 provided with a hole communicating with the orifice is disposed. By the electrode 27, the ink droplets 26 are charged based on a modulated image signal. This charging effected on the ink droplets 26 is synchronized with the frequency of an electric signal applied to the oscillator 24 by means of a control circuit to be described specifically hereinafter.

The control electrode 21 is provided with a grounding electrode 31 intergrated with an annular electrode 30 possessing a hole for passage of ink and a deflection electrode 32 opposed to the grounding electrode 31. By application of a direct-current voltage, Vt, of about 1.8 kV to the deflection electrode 32, a deflection electric field is set up in a direction perpendicular to the axis of the nozzle between the deflection electrode 32 and the grounding electrode 31. The row of charged droplets, while passing through the deflection electric field, is deflected toward and trapped by the grounding electrode 32. For the charged droplets to be trapped infallibly, the grounding electrode 32 is provided with a knife edge 33. The trapped droplets are aspirated by a suction pump 34 and forwarded to a waste tank 35. The row of uncharged ink droplets is exclusively advanced straightly and allowed to mark a dot on a recording paper 37 wound around a rotary drum 36.

Where a color image is to be formed on the recording paper 37, the head is generally provided with four nozzles 20 for severally spouting inks of the four colors, i.e. yellow, magenta, cyan, and black. There are times when a color image is formed by use of three of the four nozzles, except for the nozzle for black ink. On the recording paper 37, an image conforming with a given image data is formed by the head being reciprocated in a direction along the axis of rotation of the rotary drum 36 and the drum 36 being rotated about its axis.

To the oscillator is connected a drive signal generating circuit 40 adapted to feed an electric signal for driving the oscillator 24. From this circuit 40, a sine wave, a pulse wave, or a rectangular wave of a prescribed frequency is fed to the oscillator 24. The electric signal from the signal generating circuit 40 as illustrated is a sine wave. A shaping circuit 41 for reshaping the sine wave into a rectangular wave, therefore, is connected to the signal generating circuit 40. When the waveform of the signal issued from the signal generating circuit 40 is a pulse wave or a rectangular wave, the ink jet printer has no use for the shaping circuit 41. For the phase of the oscillation signal to be fed to the oscillator 24 to be matched with that of the charging signal for charging the ink to be fed to the charging electrode 27, the shaping circuit 41 has a delay circuit 42 connected thereto. This delay circuit 42 issues an output signal A.

The data for the image to be formed on the recording paper 37 is stored in a host computer or means of storage such as an image memory 43. The image data call out this memory 43 is converted by a modulator 44 into a recordable output signal B. The output signal B from the modulator 44 and the output signal A from the delay circuit 42 are forwarded to a synchronizing circuit 45, wherein the output signal B is synchronized by the output signal A to produce an output signal C. The construction described above has been well known in the art. It has been customary for the output signal C to be forwarded in its unmodified form to the charging electrode 27.

In the present invention, a pulse voltage control circuit 46 is interposed between the synchronizing circuit 45 and the charging electrode 27. This circuit 46 issues an output signal D, which is forwarded to the charging electrode 27.

Figure 2:
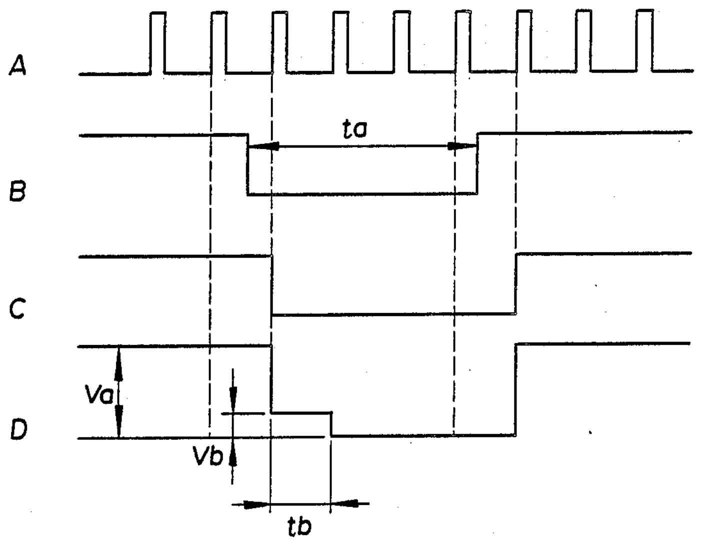
FIG. 2 is a time chart illustrating a charging voltage pulse generated by a pulse voltage control circuit of the present invention.

In FIG. 2, the symbol A stands for the waveform of an output signal from the delay circuit 42, the symbol B for the waveform of an output signal from the modulator 44, the symbol C for the waveform of an output signal from the synchronizing circuit 45, and the symbol D for the waveform of an output signal from the pulse voltage control circuit 46.

Figure 12:
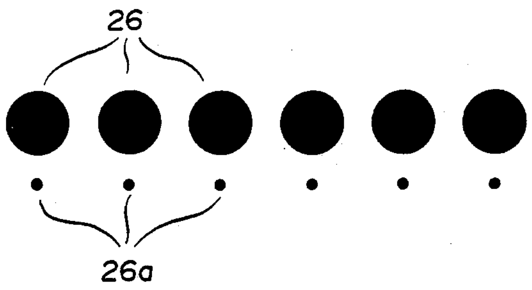
FIG. 12 is a magnituded diagram schematically illustrating the state in which ink droplets spouted from the nozzle of a conventional ink jet printer produce secondary dots.

FIG. 12 is a diagram illustrating in a magnified form ink droplets in flight within the deflection electric field. This depicts the occurrence of unwanted very minute secondary dots 26*a* responsible for impairement of the quality of an image or lines, in addition to the ink droplets 26 proper for use in recording.

It is suspected that these secondary dots 26*a* are suffered to occur because the ink droplets in flight are forced to make a deviated travel in the direction perpendicular to the direction of its flight.

Figure 13:
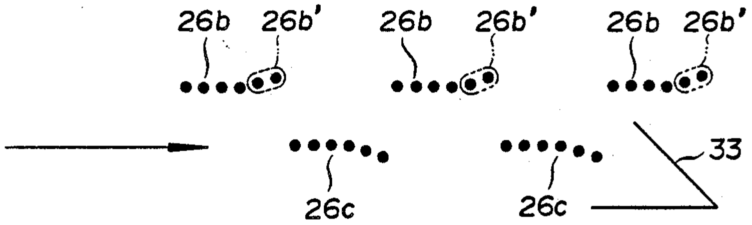
FIG. 13 is a diagram schematically illustrating the state in which a row of repulsive droplets inducive of secondary dots is generated as joined to the row of uncharged droplets.

FIG. 13 is a diagram illustrating the state of flight of the row of uncharged droplets 26*b* and the row of charged droplets 26*c* deflected within the deflection electric field produced when the charging voltage is directly fed to the charging electrode 27 as practised heretofore in the art. As illustrated in FIG. 13, the first two droplets 26*b*' from the leading end side of each of the rows of uncharged droplets 26*b* are deflected as repelled by the charged droplets 26*c* toward in the direction of the deflection electrode 31 from their proper positions relative to the other uncharged droplets. It has been demonstrated experimentally that the polarity of the uncharged droplets 26*b*' deflected by repulsion is opposite to that of the charged droplets and the amount of charge thereof is about 1/10 that of the charged droplets 26*c*. The cause for the acquisition by the droplets 26*b*' of the polarity opposite to that of the charged droplets remains yet to be elucidated. It is inferred, however, that this polarity is produced because the electroconductivity of the ink is insufficient and, therefore, the induced potential is not sufficiently neutralized during the formation of droplets.

In the present invention, after the pulse voltage of the magnitude of Va for charging is issued to the charging electrode 27 based on the image data from the memory 43 for the purpose of forming charged droplets 26*c*, the pulse voltage of the magnitude of Vb for the removal of repulsion is issued to the charging electrode 27 for a period of tb for preventing the droplets 26*b*' from deflection as illustrated in FIG. 2. The magnitude of voltage, Va, is set in the range of 50 to 200 volts, the magnitude of voltage, Vb, for the removal of repulsion in the range of 5 to 30 volts, and the duration of the time tb, in the range of 1 to 3 $\mu$S. Since the voltage Vb for the removal of repulsion is supplied to the charging electrode 27 during the initial part of the duration of the uncharged signals as described above, the droplets in the leading end side of the row of uncharged droplets 26*b* are charged with a potential enough to neutralize the repulsive force exerted by the droplets on the trailing end side of the row of charged droplets 26*c*. As a result, the rows of charged droplets 26*b* to be used for recording are allowed to advance straight in the direction of the recording paper 37 without being deflected to give rise to an image of high quality without entailing occurrence of secondary dots.

Figure 3:
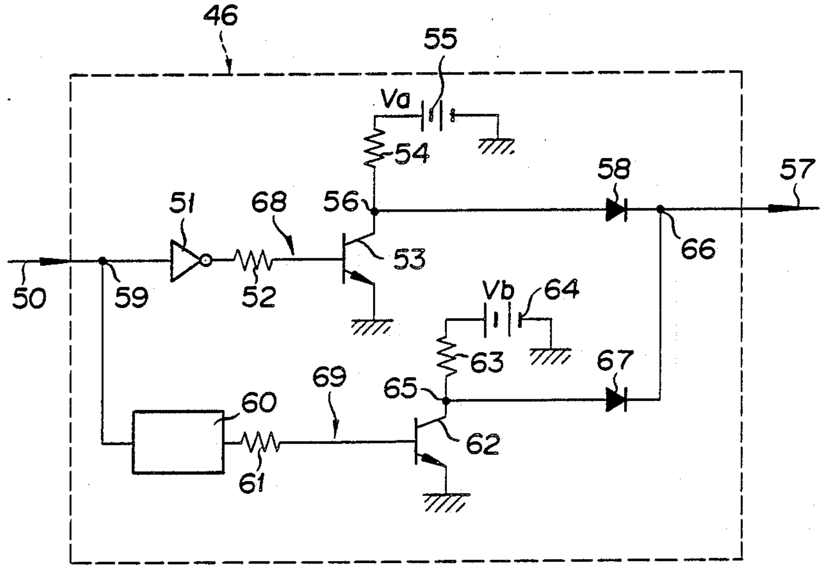
FIG. 3 is a diagram illustrating the pulse voltage control circuit for generating the charging pulse voltage illustrated in FIG. 2.

FIG. 3 is a diagram illustrating in detail the pulse voltage control circuit 46 for generating an output signal denoted by the symbol D in FIG. 2.

As illustrated, a signal conductor 50 connected to the output terminal of the synchronizing circuit 45 is connected to the base of a transistor 53 via an inverter 51 and a resistor 52 connected serially to the inverter 51. To this transistor 53, a direct current power source 55 for feeding a voltage, Va, desirably in the range of 50 to 200 volts is connected via a resistor 54. The emitter of this transistor 53 is grounded. A signal conductor 57 which is connected to a contact 56 between the collector of the transistor 53 and the resistor 54 is connected to the charging electrode 27 illustrated in FIG. 1. To this signal conductor 57 is connected a diode 58 for allowing the flow of electric current to the charging electrode 27.

To the signal conductor 50, a pulse generator 60 is connected at a contact 59. This pulse generator 60, on being triggered by the trailing end of the output pulse signal C of the synchronizing circuit 45, generates pulses for a prescribed period, tb, in the range of 1 to 3 $\mu$S, for example. This pulse generator is connected to the base of a transistor 62 via a resistor 61. To the collector of this transistor 62, a direct-current power source 64 for feeding a voltage, Vb, desirably in the range of 5 to 30 volts is connected via a resistor 63. The emitter of this transistor 62 is grounded. Between a contact 65 for interconnecting the transistor 62 and the resistor 63 and a contact 66 of the signal conductor 57, a diode 67 for allowing the flow of electric current to the contact 66 is connected.

For convenience of explanation, the circuit extending from the contact 59 to the contact 66 via the transistor 53 will be referred to as a first circuit 68 and the circuit extending for the contact 59 to the contact 66 via the transistor 62 as second circuit 69.

First in the first circuit 68, the waveform of the output signal C from the synchronizing circuit 45 is inverted and the inverted signal is applied to the base of the transistor 53. As a result, the first circuit 68 issues a potential of zero when the signal applied to the base of the transistor 53 is at a high level or a voltage, Va, equaling the potential of the direct-current power source 55 when the signal is at a low level.

Then in the second circuit 69, a pulse signal having a width of the prescribed time, tb, is applied to the base of the transistor 62, as triggered by the trailing end of the output signal C. As a result, the second circuit 69 issues a voltage, Vb, from the direct-current power source 64 for the duration of the time, tb, mentioned above when the signal applied to the base of the transistor 62 is at low level. Otherwise, it issues a potential of zero. The pulse voltages from the first circuit 62 and the second circuit 69 are synthesized to produce the output pulse denoted by the symbol D in FIG. 2. This output pulse is fed to the charging electrode 27.

The illustrated embodiment is depicted as applying a positive voltage to the charging electrode 27 for a prescribed time with the trailing end of the signal from the synchronizing circuit 45 as a trigger. Alternatively, a negative potential may be applied for the same period.

Figure 4A:
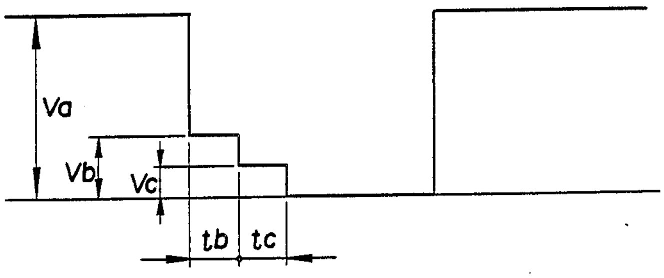
FIG. 4A is a time chart illustrating the waveform of an output pulse voltage used in another embodiment of this invention.
Figure 4B:
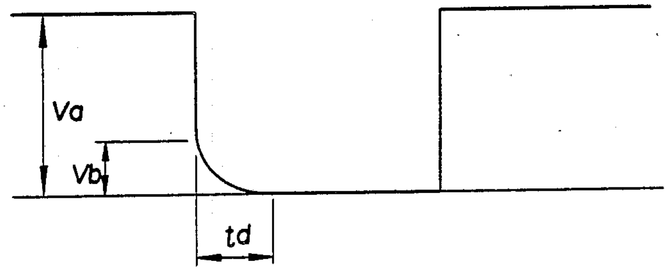
FIG. 4B is a time chart illustrating the waveform of an output pulse voltage used in yet another embodiment of this invention.

FIG. 4A and FIG. 4B are diagrams illustrating the waveforms D of the output pulse voltage from the pulse voltage control circuit 46 in other embodiments of the present invention. In the embodiment illustrated in FIG. 4A, after the pulse voltage of the magnitude, Va, for charging the ink droplets is issued to the charging electrode 27, the pulse voltage of the magnitude, Vb, lower than the magnitude, Va, is issued to the charging electrode 27 for the duration of the time, tb and, further, the voltage Vc, still lower than the magnitude, Vb, is issued to the charging electrode 27 for the duration of the time, tc.

In the embodiment illustrated in FIG. 4B, after the voltage of the magnitude, Va, for charging is issued, a pulse voltage gradually dwindling from the magnitude, Vb, to the potential zero over a prescribed time of td is issued.

Figure 5:
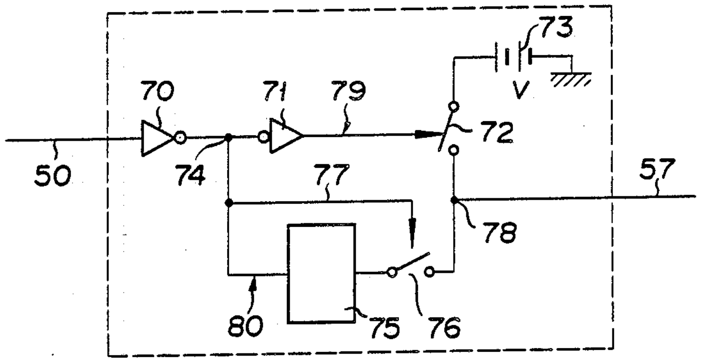
FIG. 5 is a diagram illustrating a pulse voltage control circuit for generating the output pulse voltage illustrated in FIG. 4A and FIG. 4B.

FIG. 5 is a diagram illustrating the pulse voltage control circuit 46 for generating a pulse voltage of the waveform illustrated in FIG. 4A and FIG. 4B. An inverter 70 is connected to the signal conductor 50 which is connected to the synchronizing circuit 45. This inverter 70 is connected to one contact of a switching element 72 possessing three contacts via an inverter 71. To one of the remaining contacts of the switching element 72, a direct current power source 73 for feeding the voltage Va is connected. The last contact is connected to the charging electrode 27 through the medium of the signal conductor 57.

A pulse voltage generator 75 is connected to a contact 74 which interconnects the inverters 70 and 71. One of the three contacts of a switching element 76 is connected to the output terminal of the pulse generator 75. A signal conductor 77 interconnecting the two inverters 70 and 71 is connected to one of the other two contacts of the switching element 76. The last contact is connected to the signal conductor 57 at a contact 78. The pulse generator 75 is intended to form the waveform of the pulse voltage for preventing the repulsion illustrated in FIG. 4A and FIG. 4B. This pulse voltage generator may be any of the well-known waveform generators such as a diode type waveform generator or a CR attenuation waveform generator. The switching elements 72 and 76 are each formed of any of the conventional switching elements such as FET, transistor, and IC.

For convenience of explanation, the circuit extending from the contact 74 to the contact 78 via the inverter 71 and the switching element 72 will be referred to as a first circuit 79 and the circuit extending from the contact 74 to the contact 78 via the pulse generator 75 as a second circuit 80. In the first circuit 79, the output signal from the synchronizing circuit 45 is applied to the contact of the switching element 72, with the waveform thereof inverted twice by the inverters 70 and 71 in the meantime. Owing to the switching operation of this switching element 72, a potential of zero is fed out to the signal conductor 57 when the signal applied to the contact of the switching element 72 by the inverter 71 is at a low level or a pulse of the voltage, Va, equaling the potential of the direct-current power source 73 is fed out to the signal conductor 57 when the signal is at a high level. In the second circuit 80, the control voltage for the prevention of repulsion illustrated in FIG. 4A or FIG. 4B is fed out in response to the output signal from the inverter 70. As a result, the pulse voltages from the first circuit 79 and the second circuit 80 are synthesized and the resultant pulse voltage is fed to the charging electrode 27.

Figure 14:
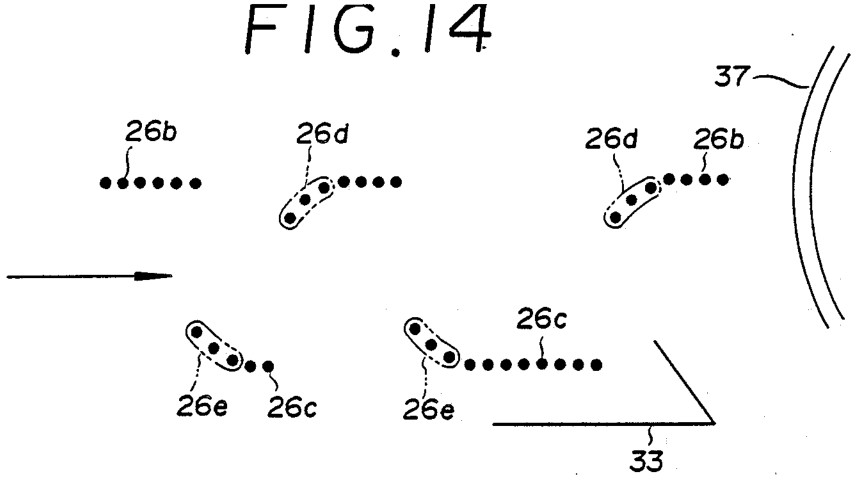
FIG. 14 is a diagram schematically illustrating the state in which droplets charged to an intermediate level are generated in the row of charged droplets and the row of uncharged droplets.

FIG. 14 is a diagram illustrating the state of flight of the row of uncharged droplets **26*b* during the course of high speed printing at an increased speed of ink flight and the row of charged droplets 26*c* deflected in the deflection electric field to be assumed when the charging voltage form the synchronizing circuit 45 is directly fed to the charging electrode 27 as practised in the conventional ink jet printer. In this case, droplets 26*d* charged to an intermediate potential are arrayed as deflected toward the grounding electrode side behind the row of uncharged droplets 26*b* and droplets 26*e* charged to an intermediate potential less than the proper potential are arrayed as deflected toward the deflection electrode side behind the row of charged droplets 26*c*** as illustrated.

Figure 15A:
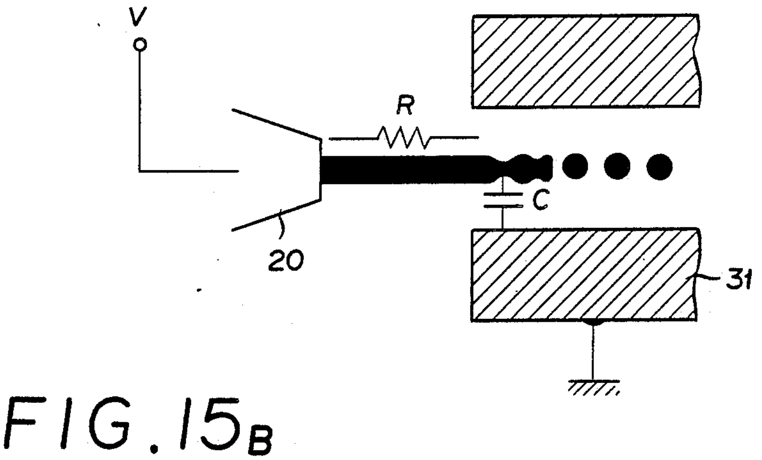
FIG. 15A is a diagram schematically illustrating a mechanism for causing ink droplets to be charged by the potential difference between the charging electrode and the grounding electrode.
Figure 15B:
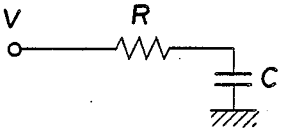
FIG. 15B is a diagram schematically illustrating an integration circuit to be formed by the resistance and the electrostatic owned by ink.
Figure 16:
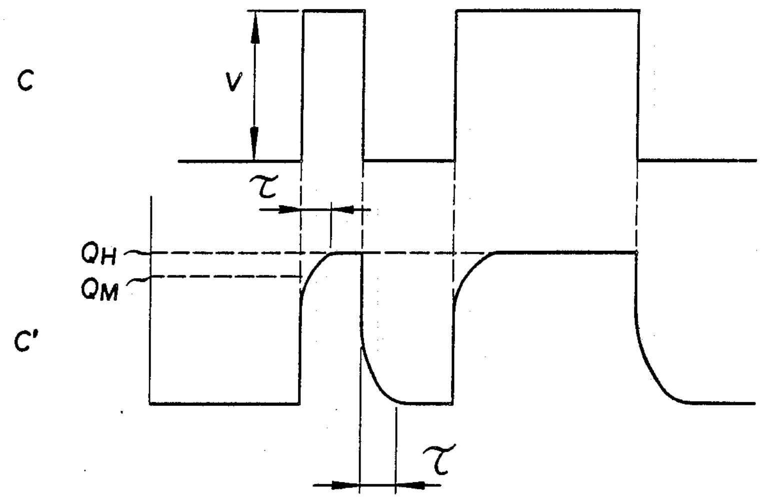
FIG. 16 is a time chart illustrating a lag of charging caused by the output voltage in the conventional ink jet printer adapted to feed the output voltage from the synchronizing circuit directly to the charging electrodes.

The occurrence of these droplets of intermediate potential may be explained as follows. FIG. 15A is a diagram schematically illustrating the mechanism of charging of the ink droplets spouted from the nozzle. When the charging voltage V, is applied to the ink droplets, the electrostatic capacity C between the ink and the grounding electrode is fully charged and a potential to be fixed as $Q = C \times V$ by the phenomenon of static induction is imparted to the ink droplets. Since the charging voltage V applied to the charging electrode 27 possesses a rectangular characteristic indicated by the symbol C in FIG. 16, the resistance R possessed by the column of ink prior to its separation into droplets and the electrostatic capacity C mentioned above form such an integration circuit as illustrated in FIG. 15B. As a result, the ink droplets assume such a charging characteristic as indicated by the symbol C′ in FIG. 16. Thus, a lag of the time constant occurs before the maximum voltage, $Q_H$, is reached when the signal of the rectangular waveform rises or before the minimum voltage, $Q_L$, is reached when the signal falls. The occurrence of this lag results in the formation of droplets **26*d*, 26*e* which are charged to an intermediate potential, $Q_M$, as illustrated in FIG. 14. The distance of deflection of charged droplets within the deflection electric field is proportional to the magnitude of potential of the charged droplets. When the droplets 26*b* properly used for recording are charged to an intermediate potential, they are deflected in the direction of the grounding electrode 32** and are prevented from landing at the normal position on the recording paper and, moreover, suffered to give rise to secondary dots to impair the image quality and defile the recording paper otherwise.

Figure 6:
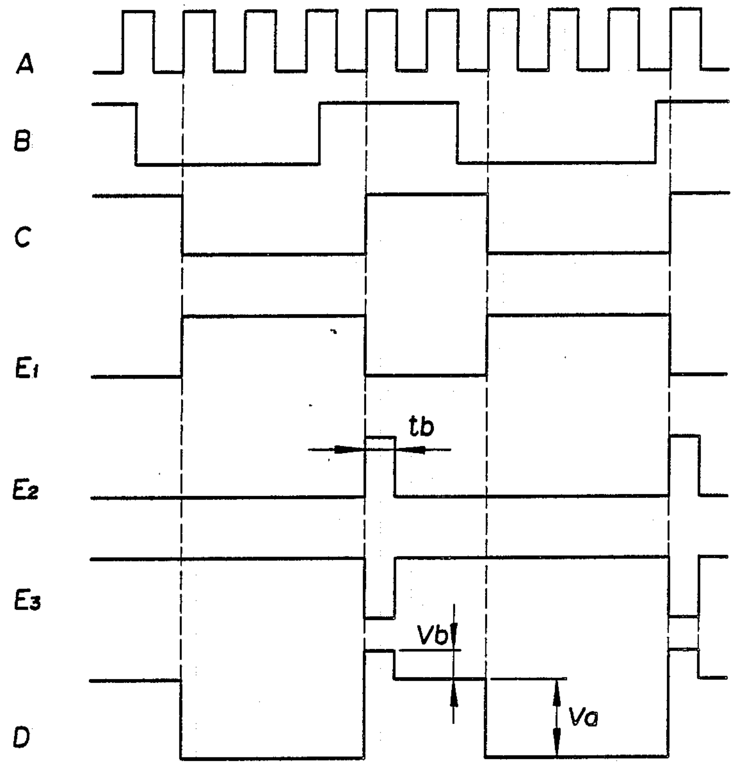
FIG. 6 is a time chart illustrating the waveform of an output pulse voltage used in a further embodiment of this invention.
Figure 7:
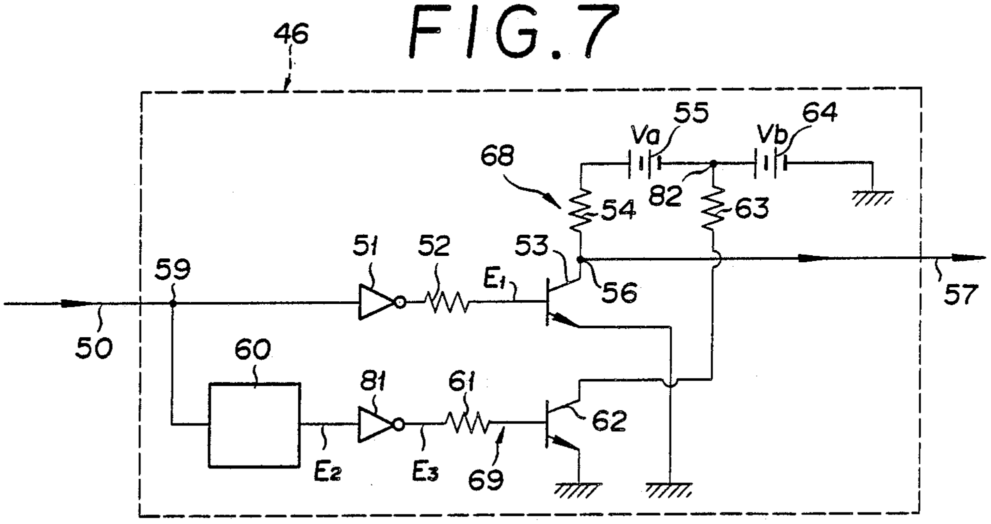
FIG. 7 is a diagram illustrating a pulse voltage control circuit for generating the charging pulse voltage illustrated in FIG. 6.

FIG. 6 illustrates output pulses fed out by the pulse voltage control circuit as another embodiment of the present invention which contemplates preventing the occurrence of a time lag between the time the voltage for charging is fed to the charging electrode and the time the ink is electrically charged. FIG. 7 is a diagram illustrating a pulse voltage control circuit for generating an output pulse illustrated in FIG. 6.

In this case, a voltage higher by a magnitude of Vb than the normal charging voltage, Va, is fed to the charging electrode 27 immediately after the uncharged state is changed to the charged state as indicated by the symbol D in FIG. 6. The basic configuration of the pulse voltage control circuit illustrated in FIG. 7 used for generating the pulse voltage for the control of the charging electrode 27 is common with the circuit illustrated in FIG. 3. The component elements illustrated in FIG. 7 which are like those illustrated in FIG. 3 are denoted by like reference numerals. As illustrated in FIG. 7, a direct-current power source 55 for feeding the aforementioned voltage, Va, and a direct-current power source 64 for feeding the aforementioned voltage, Vb are serially connected to the resistor 54. An inverter 81 is disposed to interconnect the pulse generator 60 and the resistor 61 and a contact 82 between the aforementioned two power sources is connected to the collector of the transistor 62 via the resistor 63.

In the circuit illustrated in FIG. 7, when the signal C from the synchronizing circuit 45 is fed in as illustrated in FIG. 6, this input signal C is inverted by the inverter 51 and applied to the base of the transistor 53. The output signal pulse of the inverter 51 at the point E1 of the first circuit 68 is as indicated by the symbol E1 in FIG. 6. The pulse generator 60 issues a pulse signal of a width of a prescribed time, tb, as triggered by the rise signal from the synchronizing circuit 45. This output pulse has a waveform as indicated by the symbol E2 in FIG. 6. This output signal E2 is inverted by the inverter 81 and a pulse signal of a waveform indicated by the symbol E3 in FIG. 6, which results from the inversion is applied to the base of the transistor 62.

As a result, a main signal of a potential of zero is fed to the charging electrode 27 via the signal conductor 57 when the signal applied to the base of the transistor 53 is at a high level and the signal applied to the transistor 53 is at a high level and the signal applied to the transistor 62 is at a high level. A voltage signal resulting from the synthesis of the voltage, Va, of the power source 55 and the voltage, Vb, of the power source 64 is fed out via the signal conductor 57 to the charging electrode 27 when the signal applied to the base of the transistor is at a low level and the signal applied to the transistor 62 is at a low level. The voltage, Va, from the power source 55 is fed out when the signal applied to the transistor 53 is at a low level and the signal applied to the transistor 62 is at a high level.

When the output pulse voltage indicated by the symbol D in FIG. 6 is forwarded to the charging electrode 27 as described above, a high voltage is imparted to the charged droplets and the occurrence of charged droplets **26*d* possessing an intermediate potential is prevented at the moment that the electrode 27** is switched to the voltage for charging. Thus, the occurrence of secondary dots due to the deflection of droplets used for recording can be precluded.

Figure 8:
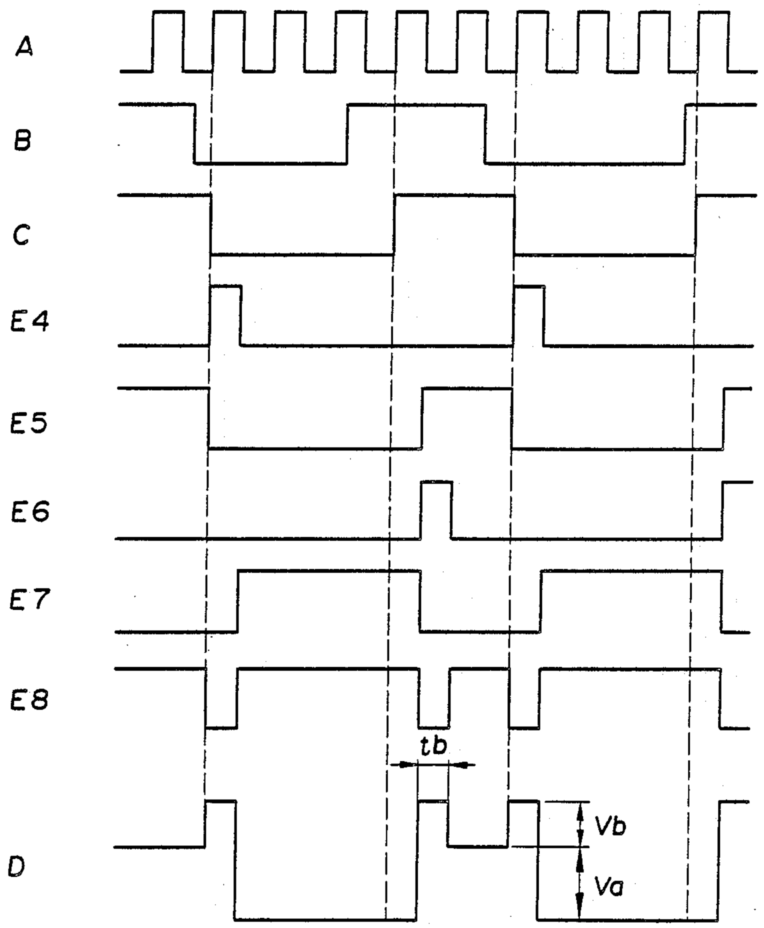
FIG. 8 is a time chart illustrating the waveform of an output pulse voltage used in still another embodiment of this invention.
Figure 9:
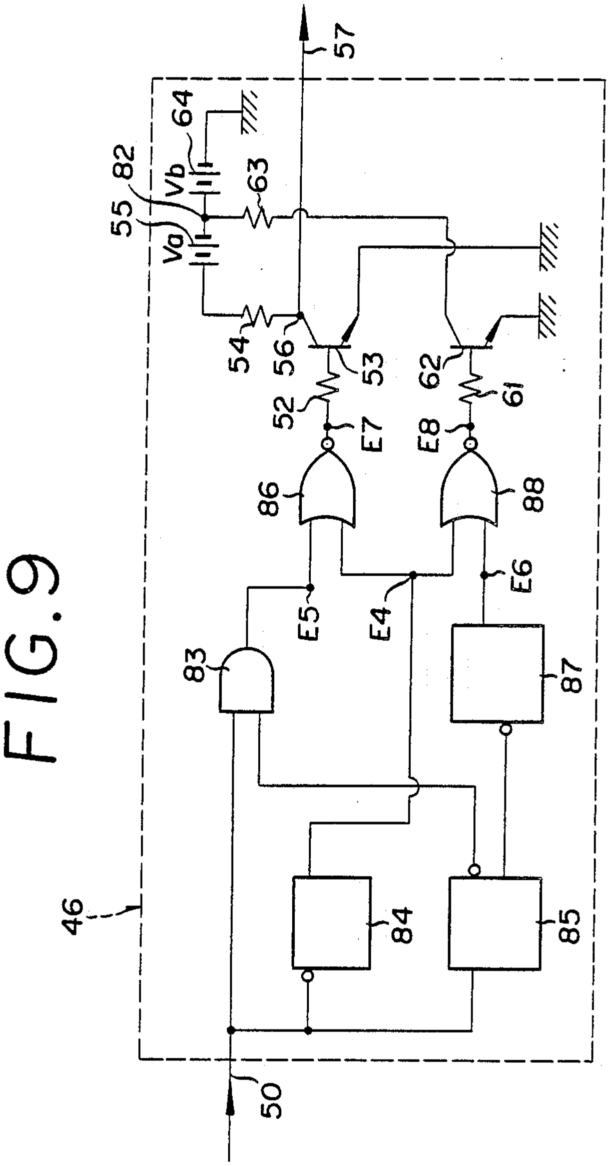
FIG. 9 is a diagram illustrating a pulse voltage control circuit for generating the charging pulse voltage illustrated in FIG. 8.

FIG. 8 is a diagram illustrating output pulses from a pulse voltage control circuit involved in another embodiment of this invention and FIG. 9 is diagram illustrating a voltage control circuit for generating the output pulses illustrated in FIG. 8.

In this case, a voltage higher by a magnitude of Vb than the normal charging voltage, Va, is fed to the charging electrode when the uncharged state is changed to the charged state as indicated by the symbol D in FIG. 8 and a voltage higher by a magnitude of Vb than the normal charging voltage, Va, is fed to the charging electrode at a prescribed time before the supply of the charging voltage. The pulse voltage control circuit 46 illustrated in FIG. 9 which is intended to generate the pulse voltage for the control of the charging electrode is provided with an AND gate 83 connected to the signal conductor 50 led out of the synchronizing circuit 45. Two pulse generators 84 and 85 are connected to the signal conductor 50. The pulse generator 84 is triggered by the trailing end of the output signal C from the synchronizing circuit 45 and set to issuing a pulse signal having a pulse width of a prescribed time, tb. The output pulse from this pulse generator 84 has a waveform indicated by the symbol E4 in FIG. 8. The other pulse generator 85 is triggered by the trailing end of the output signal C and set to issuing a positive pulse signal having width of prescribed time and also issuing a negative logical pulse signal. This negative logical output signal is fed into the AND gate 83 mentioned above. The output signal E4 of the pulse generator 84 and the output signal E5 of the AND gate 83 are injected into a NOR gate 86. The pulse of the output signal of the AND gate 83 has a waveform indicated by the symbol E5 in FIG. 8.

The positive logical output terminal of the pulse generator 85 is connected to a delay circuit 87. The output pulse from the pulse generator 85 is fed into the delay circuit 87. The output signal delayed at the output point E6 of a delay circuit 87 has a waveform indicated by the symbol E6 in FIG. 8. This output E6 and the output E4 from the pulse generator 84 mentioned above are injected into a NOR gate 88.

The output terminal of the NOR gate 86 mentioned above is connected to the base of the transistor 53 via the resistor 52. The output signal pulse from this NOR gate 86 has a waveform indicated by the symbol E7 in FIG. 9. The power source for feeding the voltage, Va, and the power source 64 for feeding the voltage, Vb, are connected serially to the collector of the transistor 53 via the resistor 54. The output terminal of the NOR gate 88 mentioned above is connected to the base of the transistor 62 via the resistor 61. The output signal E8 illustrated in FIG. 8 from the NOR gate 88 is fed into the base of the transistor 62. The collector of the transistor 62 is connected via the resistor 63 to the contact 82 between the two power sources 55 and 64.

In the pulse voltage control circuit 46 illustrated in FIG. 9, the charging signal C from the synchronizing circuit 45 is fed into the AND gate 83 and the output signal from the pulse generator 85 generating a negative output signal as triggered by the rise of the charging signal C is injected into the AND gate 83. The outcome of the arithmetic operation (the waveform E5 in FIG. 8) at the AND gate 83 is injected into the NOR gate 86. The output signal pulse E4 using the rise of the pulse signal C from the pulse generator 84 as a trigger is injected into the two NOR gates 86 and 88. A signal having a pulse width of a prescribed time and using the trailing end of the pulse from the delay circuit 87 is injected into the NOR gate 88.

Since the charging voltage indicated by the symbol D in FIG. 8 is supplied to the charging electrode from the pulse voltage control circuit 46 illustrated in FIG. 9 as described above, a voltage higher by a magnitude of Vb than the prescribed voltage, Va is supplied when the charging electrode 27 feeds out the charging voltage from the state assuming a potential of zero. The ink to be electrically charged, therefore, has a prescribed potential imparted thereof even when there is a time lag before the electrical charging of the ink takes place. As a result, the occurrence of intermediately charged droplets 26d indicated in FIG. 14 is precluded. During a prescribed period preceding the stop of the charging of the ink, a voltage higher by a magnitude of Vb is supplied. The occurrence of the intermediately charged droplets 26e illustrated in FIG. 14, therefore, is precluded.

Figure 10:
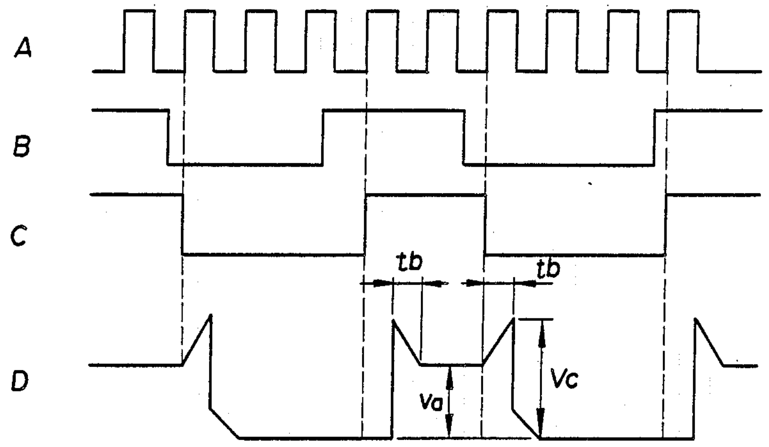
FIG. 10 is a time chart illustrating the waveform of a charging output pulse voltage used in another embodiment of this invention.
Figure 11:
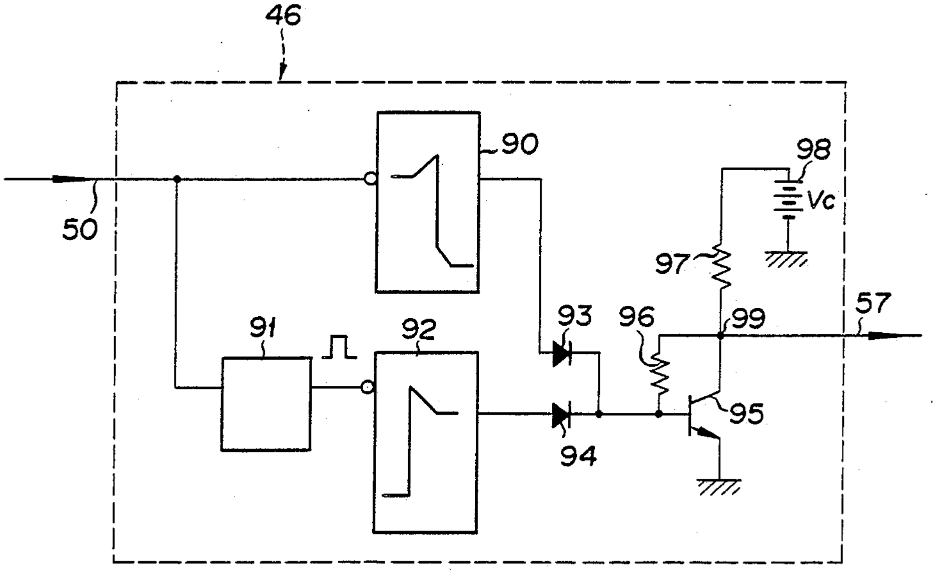
FIG. 11 is a diagram illustrating a pulse voltage control circuit for generating the charging pulse voltage illustrated in FIG. 10.

FIG. 10 is a diagram illustrating the output pulses from the pulse voltage control circuit involved in yet another embodiment of this invention and FIG. 11 is a diagram illustrating a pulse voltage control circuit for generating the pulse voltage. In this case, therefore, the occurrence of ink droplets charged to an intermediate potential illustrated in FIG. 14 and the occurrence of repelling droplets illustrated in FIG. 13 can be precluded.

In this case, when the charging voltage is supplied to the charging electrode 27, a voltage, Vc, higher than the prescribed charging voltage, Va, is supplied and this voltage is lowered to the voltage, Va, over a prescribed period tb. At a time, tb, preceding the stop of the supply of the charging voltage, the voltage is set to rising and the charging voltage is heightened to the magnitude, Vc, by the completion of the charging. After completion of the charging, a gradually decreasing charging voltage for neutralizing the repulsive force is supplied.

In the pulse voltage control circuit 46, a pulse generator 90 is connected to the signal conductor 50 serving to pass the output pulse from the synchronizing circuit 45 as illustrated in FIG. 11. This pulse generator 90 is triggered by the trailing end of the charging signal C and set to issuing a pulse signal in a substantially serrated form. Further, a pulse generator 91 is connected to the signal conductor 50. This pulse generator 91 issues a pulse signal having a width of a prescribed time, tb, after a delay of a fixed time. This pulse generator 91 is connected to a pulse generator 92. This pulse generator 92 is triggered by the trailing end of the pulse signal from the pulse generator 91 and set to issuing a pulse signal in a substantially serrated form. The pulse generators 90 and 92 are each formed by combining a waveform generator, for example, with a known integration circuit and a diode.

The output terminal of the pulse generator 90 mentioned above is connected to the anode terminal of a diode 93 and the output terminal of the pulse generator 92 is connected to the anode terminal of a diode 94. The cathode terminals of the diodes 93, 94 are connected to the base of a transistor 95 adapted to perform an amplifying operation. The collector of this transistor 95 is connected to the base through the medium of a resistor 96. To this base is further connected a direct-current power source 98 for the supply of the direct-current voltage, Vc, via a resistor 97. The emitter of this transistor 95 is grounded. The signal conductor 57 which is connected to the charging electrode 27 is connected to a contact 99 between the collector of the transistor 95 and the resistor 97.

In the pulse voltage control circuit 46 illustrated in FIG. 11, the positive logical output signals from the two pulse generators 90 and 92 are subjected to a logical operation at the diodes 93 and 94. The outcome of this arithmetic operation is applied to the base of the transistor 95. This transistor 95 amplifies the signal applied thereto to a voltage level conforming with the charging voltage and consequently issues an output voltage pulse of the waveform indicated by the symbol D in FIG. 10 to the charging electrode via the signal conductor 57.

The numerical values of the discharge pressure of ink from the pump 22 and the number of oscillations of the oscillator 24, for example, are not specifically defined but may be freely varied within the respective ranges set forth in the claim. In all the embodiments described above, the charging voltage pulse to be applied to the ink has been depicted as generated synchronously with the frequency used for dividing the column of ink into droplets, namely the frequency of the oscillator 24. This is not a critical requirement.

The ink jet printer of this invention illustrated in FIG. 1 has been described as generating a potential difference for charging between the charging electrode 27 embedded in the nozzle 20 and the grounding electrode 32. Alternatively, another grounding electrode may be incorporated in the nozzle 20 in addition to the grounding electrode 32 for the formation of the deflection electric field, so as to effect the generation of the potential difference between this electrode and the charging electrode 27.

When three or four nozzles are used for the production of a color image, oscillators 24 may be attached one each to the nozzles. Otherwise, one oscillator may be adapted so as to impart oscillation to the plurality of nozzles.

Further, all the embodiments have been described as enabling charged ink droplets to be trapped by a knife edge and allowing uncharged ink droplets to advance in the direction of the recording paper 37. This is not a critical requirement for the purpose of this invention. The ink jet printer of this invention may be modified so as to permit use of ink droplets charged to a prescribed potential for the recording, on condition that the ink droplets charged to an intermediate potential are excluded. In this case, the uncharged ink droplets are trapped by the knife edge.

The pulse voltage generating circuit has been described as being adapted to generate a fixed pulse voltage. Optionally, it may be adapted to generate a plurality of pulse voltage signals, depending on the kind of ink and the ambient conditions such as the atmospheric temperature, to permit choice of pulse waveform suiting the prevalent conditions.

In the embodiments described above, the stepwise or serrated control voltage other than the voltage for charging the charging electrode 27 has been depicted as possessing the same polarity as the voltage for the charging. Optionally, it may be adapted to possess opposite polarity.

What is claimed is:

1. A ink jet printer comprising:

spouting means for spouting a column of ink through a nozzle, nozzle oscillating means for dividing said column of ink into ink droplets, voltage applying means for selectively applying a first pulse voltage to said ink droplets thereby charging them based on image data and applying a second pulse voltage lower than said first pulse voltage to said ink droplets immediately after the application of said first pulse voltage, and means for producing a deflection electric field capable of deflecting one ink droplet charged by the application of said first pulse voltage and enabling another ink droplet not charged to proceed straight in the direction of a recording medium.

2. An ink jet printer according to claim 1, wherein the frequency of the oscillation imparted to said nozzle for the formation of said ink droplets is synchronized with the frequency of said first pulse voltage.

3. An ink jet printer according to claim 1, which further comprises charging signal generating means for generating a signal for charging said ink droplets and a signal for not charging said ink droplets based on said image data and a pulse voltage control circuit connected to a contact between said charging signal generating means and a charging electrode for charging said ink droplets, said pulse voltage control circuit comprising a first power source for supplying said first pulse voltage and a switching element for issuing the voltage pulse from said first power source during the supply of said signal for charging said ink droplets from said charging signal generating means and a second circuit comprising a second power source for supplying said second pulse voltage and a switching element for issuing the voltage pulse from said second power source during a prescribed time immediately after the supply of signal for stopping the charging of said ink droplets from said charging signal generating means.

4. An ink jet printer according to claim 3, wherein said second pulse voltage issued from said pulse voltage control circuit is in a stepped waveform comprising a first control voltage issued for a prescribed time immediately after the stop of the supply of said charging voltage from said charging signal generating means and a second control voltage lower than said first control voltage and issued for a prescribed time after the issuance of said first control voltage.

5. An ink jet printer according to claim 3, wherein said second pulse voltage issued from said pulse voltage control means is in a waveform having the magnitude of voltage gradually lowered to a potential of zero over a prescribed time.

6. An ink jet printer comprising:

spouting means for spouting a column of ink through a nozzle, nozzle oscillating means for dividing said column of ink into ink droplets, voltage applying means for selectively applying a pulse voltage to said ink droplets thereby charging them based on image data and for superposing an excessive voltage on said pulse voltage at the positive edge of said pulse voltage, and means for producing a deflection electric field capable of deflecting one ink droplet charged by the application of said first pulse voltage and enabling another ink droplet not charged to proceed straight in the direction of a recording medium.

7. An ink jet printer according to claim 6, wherein the frequency of the oscillation imparted to said nozzle for the formation of said ink droplets is synchronized with the frequency of said first pulse voltage.

8. An ink jet printer according to claim 6, which further comprises charging signal generating means for generating a signal for charging said ink droplets and a signal for not charging said ink droplets based on said image data and a pulse voltage control circuit connected to a contact between said charging signal generating means and a charging electrode for charging said ink droplets, said pulse voltage control circuit comprising a first power source for charging said ink droplets, a second power source connected to said first power source and adapted to supply an additional voltage to said first power source, a first switching element connected to said charging voltage generating means and adapted to supply the voltage from said first power source to said charging electrode upon reception of the signal for charging said ink droplets from said charging voltage generating means or to stop the supply of the voltage to said charging electrode upon reception of the signal for not charging said ink droplets, and a second switching element for supplying the voltages from said first power source and said second power source to said charging electrode for a prescribed time after reception of the charging signal from said charging voltage generating means.

9. An ink jet printer according to claim 6, wherein said voltage supplying means superposes a second excessive voltage on said pulse voltage at the negative edge of the pulse voltage.

10. An ink jet printer according to claim 9, which further comprises charging signal generating means for generating a signal for charging said ink droplets and a signal for not charging said ink droplets based on said image data and a pulse voltage control circuit connected to a contact between said charging signal generating means and a charging electrode for charging said ink droplets, said pulse voltage control circuit comprising a first power source for charging said ink droplets, a second power source connected to said first power source and adapted to supply an additional voltage to said first power source, a first switching element for supplying the voltage from said first power source to said charging electrode upon reception of the signal for charging said ink droplets from said charging voltage generating means or to stop the supply of the voltage to said charging electrode upon reception of the signal for not charging said ink droplets, and a second switching element for supplying the voltages from said first power source and said second power source for a fixed time upon reception of the charging signal from said charging voltage generating means and for fixed time after completion of the charging.

11. An ink jet printer comprising:

spouting means for spouting a column of ink through a nozzle, nozzle oscillating means for dividing said column of ink into ink droplets, voltage applying means for selectively applying a first pulse voltage to said ink droplets thereby charging them based on image data, superposing an excessive voltage on said first pulse voltage at the positive edge of said first pulse voltage, and applying a second pulse voltage lower than said first pulse voltage to said ink droplets immediately after the application of said first pulse voltage, and means for producing a deflection electric field capable of deflecting one ink droplet charged by the application of said first pulse voltage and enabling another ink droplet not charged to proceed straight in the direction of the recording medium.

12. An ink jet printer according to claim 11, wherein said voltage supplying means superposes a second excessive voltage on said pulse voltage at the negative edge of the pulse voltage.

13. An ink jet printer according to claim 12, which further comprises charging signal generating means for generating a signal for charging said ink droplets and a signal for not charging said ink droplets based on said image data and a pulse voltage control circuit connected to a contact between said charging signal generating means and a charging electrode for charging said ink droplets, said pulse voltage control circuit comprising pulse generating means for increasing the voltage to the maximum and thereafter lowering gradually said voltage to a proper charging voltage upon reception of the signal for charging said ink droplets from said charging voltage generating means, starting to increase the voltage at a prescribed time before reception of the signal for terminating the charging, and lowering the voltage to a prescribed magnitude and then issuing a pulse signal for gradually lowering the voltage upon reception of a signal for terminating the charging, a power source, and an amplifier for supplying a voltage from said power source proportionate to said pulse waveform to said charging electrode.

* * * * *